Aug. 29, 1967   W. L. PRESCOTT   3,337,973
HAND CART
Filed March 19, 1965
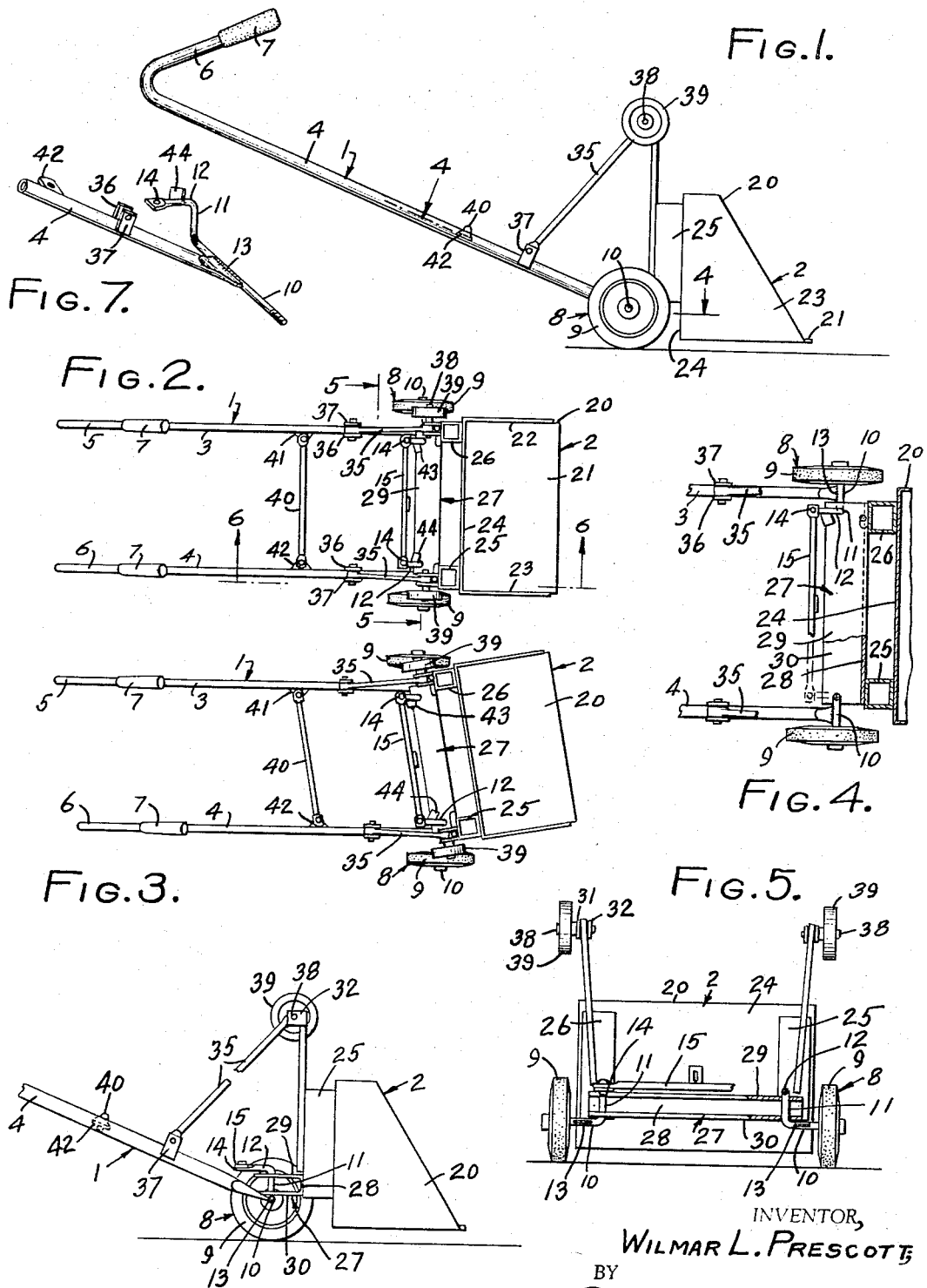
INVENTOR,
WILMAR L. PRESCOTT
BY
Calvin Brown,
ATTORNEY

United States Patent Office

3,337,973
Patented Aug. 29, 1967

3,337,973
HAND CART
Wilmar L. Prescott, 5361 Russell Ave.,
Hollywood, Calif. 90028
Filed Mar. 19, 1965, Ser. No. 441,243
7 Claims. (Cl. 37—53)

The present invention relates to a handcart of a type which is wheeled and provided with a scoop or bucket, the bucket being movable to different angularities while the wheels maintain a given path of movement without turning. A device of the character just stated is of use in receiving trash in the scoop for transportation particularly where the hand cart must travel a narrow pathway and one wherein the wheels could not be turned to change the direction of cart movement.

An object of the invention is the provision of a hand cart which is easily manipulated by an operator to control angular movements of a scoop or bucket while maintaining a substantially straight line path of movement for the cart.

A further object is the provision of a hand cart provided with a scoop or bucket wherein the cart is steerable in the direction of angular movement of the bucket.

A further object is the provision of a hand cart which may be utilized for various purposes such as the carrying of heavy objects, soil, ice, snow, rock, debris, etc. and in which the object being carried may be readily deposited from the cart at one side of the cart.

A further object is the provision of a hand cart of simple, inexpensive construction, which is foolproof in operation, readily manipulated by an operator and which will readily carry loads of different character with ease and dispatch.

With the above and other objects in view, the invention consists in the novel and useful provision, formation, construction, association and relative arrangement of parts, members and features, all as shown in one embodiment in the accompanying drawing, described generally, and more particularly pointed out in the claims.

In the drawing:
FIGURE 1 is a side elevation of the hand cart;
FIGURE 2 is a top plan view of the hand cart shown in FIGURE 1;
FIGURE 3 is a view similar to FIGURE 2, one of the members of the cart being in moved position;
FIGURE 4 is a fragmentary sectional view on the line 4—4 of FIGURE 1;
FIGURE 5 is a sectional view on the line 5—5 of FIGURE 2, and on an enlarged scale; and
FIGURE 6 is a sectional view on the line 6—6 of FIGURE 2.
FIGURE 7 is a perspective view of a lower portion of the frame assembly.

Referring to the drawing, the hand cart, truck, or dolly, includes a frame assembly 1 mounted upon wheels and a scoop or bucket assembly 2 which may assume, under control of an operator, various angularities relative to the frame assembly. The frame assembly 1 includes a pair of elongated arms 3 and 4 of identical form which arms are reversibly bent to form a V at 5 and 6 so as to overlie the main length of the arms and provided with sleeve type hand grips designated generally as 7. The lower or forward end of each arm is secured to a wheel assembly 8. As each side of the wheel assembly for a pair of wheels is identical in construction as is likewise the arms of the frame assembly, one of the arms of the frame assembly and of the wheel assembly will be described, the same numbers of reference applying to the other arm of the frame assembly and the wheel assembly. Thus, the wheel 9 of a pair of wheels for the forward end of the hand cart, is mounted upon a spindle 10 of an elongated rod, the rod being bent to provide a pin 11 at a right angle to the spindle and the rod bent beyond the pin 11 to provide an arm 12. The axes of the spindle and arm 12 are in right angular relationship to the axis of pin 11 and the axes of the spindle 10 and of the arm 12 are likewise in substantially right angular relationship or any other respective right angular relationship. As stated, the wheel 9 is carried on the spindle 10 and suitably held thereto in any approved manner such as by a nut secured to the threaded end of the spindle and with the lower or outer end of the arm 3 welded or otherwise secured at 13 to the spindle between the wheel 9 and the pin 11. The outer end of arm 12 is flattened and provided with a transverse bore as shown at 14 and as shown in FIGURES 2 and 3 the ends 14 are interconnected for both sides of the cart by means of a tie bar 15. The frame, wheel, and scoop assemblies are interconnected as follows: The scoop assembly 2 includes the scoop 20 of usual form which, say, has a bottom wall 21, a pair of side walls 22 and 23 and a rear wall 24 joining both the side walls and the bottom wall, the rear wall being connected to and carried by a pair of tubular uprights 25 and 26 of any selected cross section, such as square, the uprights in turn being secured to a channel bar 27 which extends between the uprights 25 and 26 and is secured to a face of said uprights, as shown in the several figures. The channel bar 27 has the usual web 28 joining legs 29 and 30 and the web 28 is secured to the uprights in any approved manner. The legs 29 and 30 provide knuckles for the pins 11 by providing bearing openings in both legs for transversely receiving the pins 11, as shown in FIGURES 5 and 6. I have found this type of structure easy to fabricate, stable and provides an effective cantilever support for the scoop or bucket. Furthermore, the parts are maintained in assembly for the reason that the spindles 10 are positioned below the leg 30 while the arm 12 is positioned above leg 29. The uprights 25 and 26 have attached thereto, on the outer faces thereof, pairs of upright bars 31 and 32, which bars extend above the height of the uprights 25 and 26 as shown in FIGURE 1. For each side of the structure there is a link 35 secured between the upright bars 31 and 32 for one end of the link while the opposite end thereof is pinned between a pair of lugs 36 and 37 which are secured to each arm 3 and 4. The connection between the upright bars 31 and 32 is such as to provide a stud axle 38 upon which is mounted a wheel 39. Thus both sides of the hand cart are provided with upper and lower wheels as shown in the several figures.

For further stabilization of the structure I provide a tie bar 40 between the arms 3 and 4 with ends of the tie bar pinned to lugs carried by said arms as shown in FIGURE 2 at 41 and 42.

In the construction shown I have provided short length lugs extending from and attached to the arms 12 as shown at 43 and 44. These lugs act as stop members to limit the turning movement of the scoop by contact with the uprights 25 and 26.

The operation, uses and advantages of my invention are as follows.

The operator of the hand cart engages grips 7 to move the cart upon either the wheels 9 or 39 depending upon the position of the scoop or bucket. Assuming that the wheels 9 are engaging the ground, the operator pushes upon the hand grips to move the hand cart forwardly and if the scraper edge of the scoop as well as the scoop is to be turned sideways to the direction of movement of the cart, the operator pushes upon one of the grips and while holding the other grip or by pulling on the other grip to turn the scoop or by swinging arms 3 and 4 sideways.

Thus, referring to FIGURE 3 it is assumed that the wheels 9 are moving straight ahead and upon pushing the arm 4 forwardly while holding the arm 3 the wheels 9 continue in the path of movement without deviation but turn the scoop sideways, as shown in FIGURE 3. This operation is accomplished for the reason that the arms 3 and 4 maintain a substantially parallel position and each arm is fixedly secured to a spindle 10. As the arms are interconnected by a tie bar 40, a shifting of the arms by moving one forwardly and the other arm backwardly or by holding one arm against movement, does not turn wheel direction. This results from the fact that the pins 11 are passed through the legs 29 and 30 of the U-bar and therefore are spaced a fixed distance apart with the arms 12 likewise held at a fixed distance apart by the tie bar 15. As the U-bar is connected to the uprights 25 and 26 which in turn are secured to the scoop, the lineal shifting of the arms 3 and 4 from the position of FIGURE 2 to FIGURE 3, by way of example, turns the scoop at an angle while maintaining the wheels in a straight forward position. By straight forward position I mean a position which parallels the arms 3 and 4, although the wheel on one side of the cart may be slightly advanced from the wheel on the opposite side as shown in FIGURE 3. This is so designed for easy movement over rough ground or surfaces.

If the hand cart is reversed in position from the position of FIGURE 1, that is, turned upside down, the wheels 39 may rest upon the supporting surface, such as the ground. In this case, a lineal shifting of the arms 3 and 4 will swing the scoop from side to side to a given line of transitional movement but will likewise shift the wheels 39 as shown in FIGURE 3 for the reason that the upright supports at 31 and 32 for each side connect with the stud axles 38 for said wheels 39 and the upright supports aforesaid are directly connected to the upright scoop supports 25 and 26. The linkage 35 has play between the clevis type lugs 36 and 37 connected to the arms 3 and 4 and likewise play between the upright members 31 and 32. When the wheels 39 are utilized, it is obvious that shifting of the arms 3 and 4 will turn the wheels in the direction of the movement of the scoop while the opposite wheels 9 when used maintain a position which parallels the arms 3 and 4. It will thus be seen that I have provided a hand cart in which a pair of supporting wheels are provided and which supporting wheels at all times in their movement forwardly or backwardly is parallel with the arms 3 and 4 but a shifting of the arms in a linear direction forwardly or backwardly or sideways swings or shifts the scoop or bucket at an angle to the cart's linear direction of movement.

Side swinging movement of the scoop may perform a digging operation in material to be moved such as snow, dirt, rock and the like and the digging operation is performed in a simple manner by simply laterally moving the arms 3 and 4. The length of the arms 3 and 4 affords a mechanical advantage in the lifting and carrying of heavy weights by the scoop. The tie bar 40 is so positioned that the foot may engage the same to push the scoop into the material. When the top wheels 39 are utilized, it is apparent that the scoop is in an upside down position and therefore is easily cleaned of material therein. The top wheels 39 easily support the cart due to the truss type design afforded by the members 31, 32 and 35.

In the specification I have termed certain elements of the invention as spindle 10, pin 11, and arm 13, the combination of which constitutes a crank and wherein the pin constitutes the web between the arm and the spindle; the uprights 25 and 26 are struts whether of tubular form or not and the channel bar is also a channel beam or a U-bar.

I claim:

1. A hand cart, including: a scoop having a rear wall, a pair of struts secured to the rear wall of the scoop, a beam secured between the struts, a pair of cranks secured to ends of the beam, each crank having a web, a spindle and an arm in offset relationship, a wheel carried on each spindle, a tie rod secured between the crank arms, and a pair of elongated arms having handles secured to the spindles whereby a longitudinal swinging movement of the elongated arms shifts the scoop laterally relative to the path of movement of the wheels.

2. The device as set forth in claim 1, wherein the web of each crank is of pin form, the pin being passed transversely through the beam.

3. The device as set forth in claim 1, said beam being of channel form to provide a pair of legs, and the web of said crank being passed transversely between the legs.

4. The device as set forth in claim 1, each elongated arm having one end thereof fixedly secured to a spindle of a crank.

5. The device as set forth in claim 1, wherein each elongated arm is provided with a reversibly bent handle portion.

6. The device as set forth in claim 1, and a wheeled truss structure secured between the struts and the elongated arms.

7. The device as set forth in claim 1, and a second pair of wheels above the scoop, upright supports secured to the struts and to axles carrying the second pair of wheels and links between the second pair of wheel axles and the elongated arms.

References Cited

UNITED STATES PATENTS

| | | | |
|---|---|---|---|
| 1,375,505 | 4/1921 | Grady | 37—53 |
| 2,803,071 | 8/1957 | Pochopien | 37—53 |
| 2,919,504 | 1/1960 | Rubin | 37—53 |
| 3,066,945 | 12/1962 | Prescott | 280—47.11 |
| 3,242,598 | 3/1966 | Wright | 37—130 |

ABRAHAM G. STONE, *Primary Examiner.*

R. L. HOLLISTER, *Assistant Examiner.*